United States Patent [19]

Pringle

[11] Patent Number: 5,159,960
[45] Date of Patent: Nov. 3, 1992

[54] HANDLING SYSTEM FOR LIGHTWEIGHT CONTAINERS INCLUDING BALLAST DISPENSER

[75] Inventor: Frank G. Pringle, Medford, N.J.

[73] Assignee: R&D Innovators, Inc., Medford, N.J.

[21] Appl. No.: 595,585

[22] Filed: Oct. 11, 1990

[51] Int. Cl.⁵ ............................................. B65B 3/04
[52] U.S. Cl. ................................. 141/1; 141/9; 141/169; 414/331; 414/417
[58] Field of Search ........... 141/1, 9, 103, 129, 141/163, 169, 170, 171, 172; 414/237, 239, 240, 241, 242, 331, 417; 198/453

[56] References Cited

U.S. PATENT DOCUMENTS

| | | | |
|---|---|---|---|
| 1,292,994 | 2/1919 | Bayer | 134/62 X |
| 2,516,998 | 8/1950 | Kimball et al. | |
| 2,673,567 | 3/1954 | Fruhling | 134/62 X |
| 2,915,773 | 12/1959 | Whelan | |
| 3,020,939 | 2/1962 | Donofrio | 141/237 X |
| 3,079,936 | 3/1963 | Hockett et al. | |
| 3,159,164 | 12/1964 | McBrady | |
| 3,270,783 | 9/1966 | Hughes | |
| 3,545,024 | 12/1970 | Randrup | |
| 3,674,060 | 7/1972 | Ruekberg | |
| 3,985,096 | 10/1976 | Guimbretiere | |
| 4,055,202 | 10/1977 | Greene | 141/237 X |
| 4,061,152 | 12/1977 | Babunovic | |
| 4,270,584 | 6/1981 | van Lieshout | 141/237 X |
| 4,325,775 | 4/1982 | Moeller | |
| 4,411,295 | 10/1983 | Nutter | 141/237 X |
| 4,544,059 | 10/1985 | Mernoe | 198/453 |
| 4,683,009 | 7/1987 | Shriver | |
| 4,715,920 | 12/1987 | Ruppman et al. | |
| 4,779,634 | 10/1988 | Gutierrez et al. | |
| 4,962,843 | 10/1990 | Ouellette | 198/453 |

Primary Examiner—William A. Cuchlinski, Jr.
Assistant Examiner—G. Bradley Bennett
Attorney, Agent, or Firm—Eckert Seamans Cherin & Mellott

[57] ABSTRACT

Lightweight containers such as polyethylene terephthalate (PET) beverage bottles are rendered stable for conveyance on a horizontal conveyor by addition of water ballast. Ballast in the amount of about 3 to 10% of the bottle volume is sufficient to enable increased production line speed with fewer bottle jams due to the lightweight bottles falling over. The bottles are arranged upright, for example at the outlet of a depalletizer, and loaded with ballast from a reservoir or pressurized supply of water. Preferably, the bottles are loaded in a group and a plurality of valves having valve bodies on a movable common support open simultaneously. The ballast is removed at the bottle rinsing station, which inverts the bottles to drain the ballast as well as rinse water.

20 Claims, 3 Drawing Sheets

HANDLING SYSTEM FOR LIGHTWEIGHT CONTAINERS INCLUDING BALLAST DISPENSER

BACKGROUND OF THE INVENTION

1. Field of the Invention

This invention relates to the field of container handling, for example in bottling plants, and in particular to an improvement of handling systems for plastic bottles, including a method and apparatus for adding a quantity of ballast to the bottles for stable transport on horizontal conveyors.

2. Prior Art

In a conventional bottling system, empty bottles are supplied on pallets wherein levels of bottles are stacked on one another with interleaved panels providing a supporting surface for the bottles on each level or rank. A depalletizer receives the pallet and raises the pallet until the topmost level or rank of bottles is coplanar with a receiving platform. The rank of bottles is then urged laterally onto the receiving platform. The receiving platform leads to a funnel-like path wherein successive decreases in width force the bottles into single file, from which the bottles proceed one after another through continuously operating processing steps. This funnel-like section serves to accumulate the bottles because each rank from the depalletizer requires a certain time to be converted from an X-Y array of bottles to a single file, and theoretically, the next rank is supplied just as the previous rank is exhausted.

The bottles in the single file are then carried by a conveyor typically having one or more endless loops of conveyor belt, horizontally attached link plates, or rollers, which define a moving horizontal platform for supporting the bottles while advancing the bottles to the next processing station. Each bottle simply rests on a horizontal surface which is moved to advance the bottle. The bottles move through stations typically including the depalletizer and funnel arrangement as described, a bottle washer or rinser, where the bottles are inverted and a fluid is sprayed in from below and then allowed to drain, and a filler and capper. The filler and capper has a carousel with a plurality of filling positions at which an empty bottle can be received, filled and finally capped, while moving along a conveying path.

The bottling system preferably runs continuously. For maximum production it is necessary to avoid both stoppages of the line and gaps in the single file progression of bottles. In addition to the lost production caused by gaps in the line, the bottles to some extent support one another upright as they are moved along the conveyor. Where gaps occur, the bottles leading and trailing the gap lack support from adjacent bottles and more easily fall over. When a bottle falls over, the entire line may become jammed.

The depalletizer which unloads ranks of bottles necessarily operates intermittently. Therefore, it is not possible to avoid all gaps in the progression of bottles. Similarly, various occurrences along the path of the bottles may result in gaps opening up. Typically, one or more workers are required to watch the line and to clear jams.

The general nature of bottling plants is well known and well developed. In recent years, however, plastic containers have come into use. The plastic containers are thin but durable, and light in weight, which qualities have obvious advantages in reduction of shipping weight, ability to use lighter production equipment and the like. However, the bottles are so lightweight as to be unstable when carried on a horizontal conveyor surface. In order to avoid jamming of bottling lines when running plastic bottles, the lines are run substantially more slowly than a comparable line running glass bottles, which are heavier and therefore more stable. Even at slower rates of throughput, the plastic bottles tend to fall over much more frequently than do glass bottles, and more workers are needed to correct recurrent jamming and resume proper operation of the line.

Plastic bottles are used for a wide variety of products. A typical lightweight plastic bottle is made of polyethylene terephthalate (PET). Standard bottle capacities, for example for beverage containers are 16 ounce, 20 ounce, 1 liter and 2 liter. Of course other sizes are also possible and in standard use for various products. In recent years, technical advances have reduced the weight of plastic bottles by as much as 30%. Whereas a glass bottle in a beverage container size might weigh 6 ounces, the comparable plastic bottle may weigh only 0.25 ounce. The bottles are generally relatively tall and thus are easily knocked over by uneven conveyor passages, impacts, or even by a breeze in the bottling plant.

Plastic bottles can be made with an excess of plastic at the bottom, which helps to preclude fallover. A "petaloid" form of bottle has a scalloped bottom with radially oriented folds which increase the rigidity of the bottle at the bottom and also provide additional weight at the bottom due to the additional material at the fold. Another form of bottle is the "champagne" type, which has an inward dome in the bottom. Some bottles are supplied with an outer reinforcing cup that is bonded to the outside of the bottle at the bottom. The reinforcing cup is generally made of less expensive plastic than PET, is opaque rather than clear, and defines a bottom weight that makes the empty bottle more stable when placed on its bottom. The reinforcing cup, however, conceals the content at the bottom, requires additional manufacturing steps and renders the bottle unacceptable for recycling into new PET material. The bottom cap can add as much as 15% to the weight of the bottle. Recycling operations typically cut off and discard the entire bottom of cupped bottles in order to recycle the PET top.

Another method for dealing with problems encountered in handling plastic bottles is to vary the nature of the conveyor. According to one method, the plastic bottles are not carried on horizontal support surfaces, but rather by a structure having rails or flanges that face inwardly near the neck of the bottle. The bottles are provided with a circumferential bead or flange at the neck, that rests on the conveyor rails to support the bottle. In an embodiment known as an Airveyor, the bottles are supported entirely by the rails, and blasts of air are used to propel the bottles along the conveyor path. While such systems are useful, it would be desirable to provide a substantially jam-proof arrangement that does not require added bottle material, processing requirements and/or conveyor structure.

In order to enable an increase in production speed in processes such as bottling plants which require the handling of plastic bottles, it would be desirable to render the bottles more stable without increasing the cost of bottle production and materials. It would also be desirable to provide a means to render the bottle stable temporarily, i.e., when empty, which does not increase the weight of the bottle. It would be most desirable to enable plastic bottles to run dependably on simple horizontal conveyor surfaces, in the same manner as a glass bottle.

SUMMARY OF THE INVENTION

It is an object of the invention to facilitate handling of lightweight containers, especially plastic bottles, by temporarily increasing the weight of the bottles during handling while empty, using an easily placed and easily removed ballast.

It is another object of the invention to provide an improvement for bottle handling apparatus in the form of a particular method and apparatus for adding ballast to bottles.

It is a further object of the invention to add weight to bottles in a manner that does not add to the permanent weight, use of materials or handling problems associated with bottles.

These and other objects are accomplished by a method for handling lightweight open containers, including arranging the empty containers in an upright orientation, dispensing a quantity of ballast into the containers, and moving the containers along a conveyor, the ballast tending to keep the containers stable on the conveyor. The ballast is preferably water and can be removed after the bottles have been moved on the conveyor, for example by inverting the containers to drain the ballast by gravity. In a bottling plant the typical rinsing apparatus can be used to empty the bottles of ballast in this manner. This arrangement works quite well with polyethylene terephthalate (PET) bottles, and precludes many of the problems of bottle fallover and bottle jamming that are associated with very lightweight bottles. The amount of ballast dispensed into the containers need not be a large amount, for example 3 to 10% of a total volume of the containers, or enough to put about 0.5 to 1.0 inch of ballast in the bottom of the containers.

Preferably, the ballast is added at an early point in processing empty containers, for example immediately after depalletizing the bottles. The ballast can be added at this point by an array of valves associated with a ballast reservoir under which the bottles are passed while arranged in a corresponding array in an upright orientation. Once the ballast is added the bottles can be handled at high speeds and through various obstructions, for example the series of narrowing structures along the conveyor that form a rank of bottles into single file.

The valves communicating with the reservoir or other source of ballast can by arranged in an X-Y array or in a line. According to a preferred embodiment the valves are defined by a plurality of openings in a reservoir wall controllably plugged by valve bodies attached to a common support. The valves are opened simultaneously by displacing the common support.

BRIEF DESCRIPTION OF THE DRAWINGS

The invention is described herein with reference to a number of exemplary embodiments but is capable of embodiment in other specific forms in accordance with the invention as defined in the appended claims. In the drawings.

DETAILED DESCRIPTION OF THE PREFERRED EMBODIMENTS

The invention provides a method for handling lightweight open containers, particularly plastic containers such as beverage bottles, but also including other forms of empty containers and the like which are subject to falling over when carried on a conveyor. The containers are arranged in an upright orientation, a quantity of ballast is dispensed into the containers, and thereafter while moving along a conveyor, the ballast keeps the containers stable. After serving its stabilizing function, the ballast is removed, preferably simply by inverting the containers at a container rinser.

Figure 1:
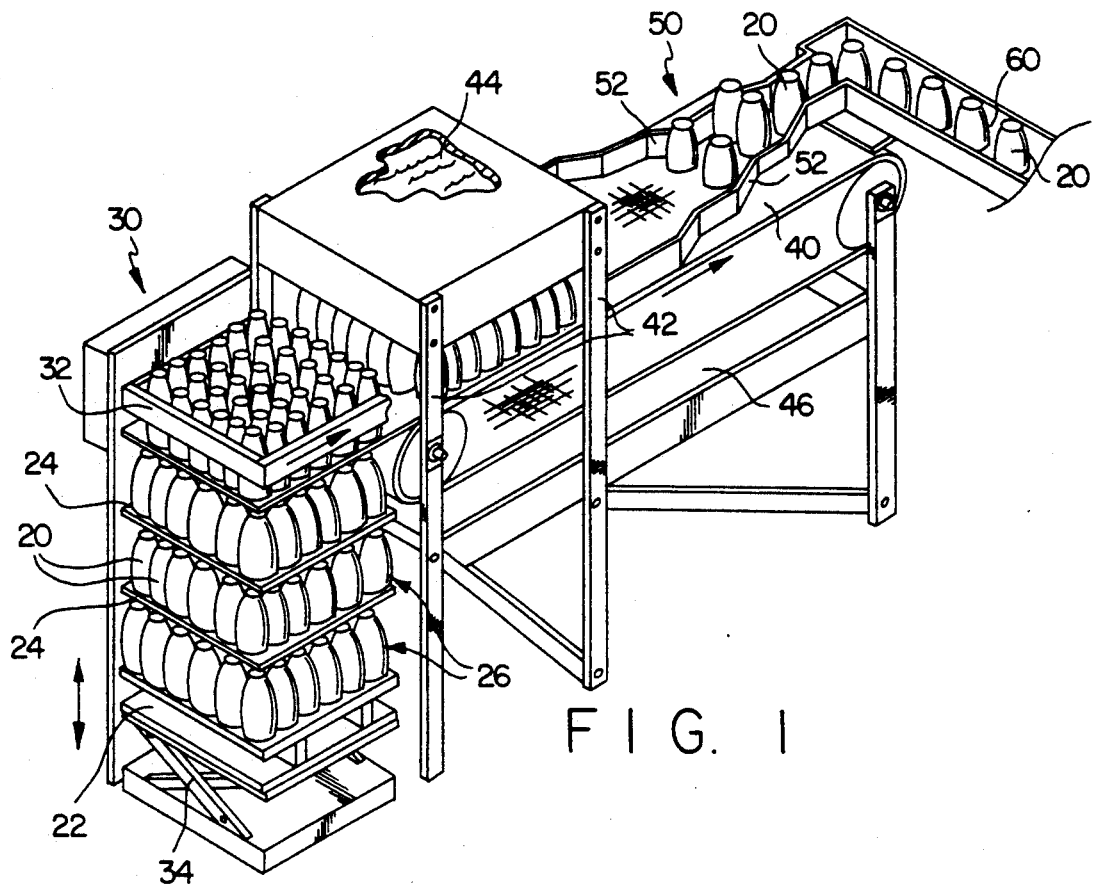
FIG. 1 is a perspective view of an initial section of a container handling process according to the invention, with a depalletizer leading to a horizontal conveyor.

FIG. 1 illustrates the initial section of a container processing plant, in particular a bottling plant as may be typically used in marketing beverages in 16 or 20 fluid ounce or 1 or 2 liter bottles. The containers can be polyethylene terephthalate (PET) bottles, which are quite light in weight. The containers in general pass through stages of depalletizing, ballast loading, rinsing (which includes inverting the containers and thereby unloading the ballast), filling and capping.

The depalletizer 30 receives a pallet 22 of bottles 20 or the like. The bottles 20 are supplied in a plurality of horizontal levels or ranks 26. For example, each rank may have 300 or more bottles, standing upright on their bottoms on a divider panel 24. The depalletizer 30 includes a vertical indexing drive means 34 operable to raise the pallet 22 in increments equal to the vertical height of a rank 26 and its base panel 24. After each index the uppermost rank is disposed at the same level as a conveyor 40. A sweep bar or housing 32 encloses around the periphery of the uppermost rank, and when the uppermost rank is in position the sweep bar 32 advances toward and over conveyor 40 to move the peripherally enclosed bottles onto the conveyor 40. Conveyor 40 can be arranged to index synchronously with advance of the sweep bar or can be continuously moving. Conveyor 40 in the embodiment shown defines an endless loop, however, it can be made up in sections of smaller endless loops. The conveyor can have a continuous flexible mesh or the like, or can be made of linked plates. At least the section in the area of the ballast loading apparatus 160 is foraminous or arranged with gaps, such that spillage of the ballast can fall through to a receptacle therefor.

The ballast can be loaded by passing the upright bottles through a continuous downward spray. However, this id somewhat wasteful of water and/or pumping capacity. Each rank of bottles at the depalletizing stage in processing is arranged in an orderly fashion, with the bottles disposed in a regular X-Y array. The ballast loader 160 accordingly preferably has dispensing orifices for each position in the array, operated briefly when the bottles are aligned with the dispensing orifices. When the rank 26 advances to a point in registry with the ballast loader, which can be timed or sensed, the ballast loader is activated and a quantity of ballast, preferably clean water, is dispensed into each of the bottles in the array. The added ballast renders the bottles substantially more bottom heavy and stable, reducing the tendency of the bottles to fall over. Without the added ballast the bottles would often fall over, particularly at the leading and trailing lines in the rank, where no neighboring bottle is disposed to help keep the outermost bottles upright. Without ballast, it is also sometimes the case that an inwardly falling bottle will cause a whole line of bottles to fall in a domino effect.

It is also possible to add ballast to a limited number of bottles in a rank, although this is not preferred. For example, ballast could be added to the peripheral bottles only, thus defining a stable wall of bottles enclosing the unstable internal bottles. Ballast could also be added to every other bottle, etc. However, since the relative positions of the bottles is not retained throughout the process, it is preferred that all the bottles be loaded with ballast.

The bottles now moving in a stable rank along conveyor 40 are converted into a row arrangement to be carried further through the process along conveyor 60. There are a number of possibilities for converting an X-Y array into a row. In the embodiment illustrated in FIG. 1, for example, the lateral sidewalls enclosing conveyor 40 are narrowed incrementally, forcing the bottles 20 to merge into a row for receipt on single file conveyor 60. It will be appreciated that such a sequence of obstructions would frequently cause bottles to fall over, particularly if the conveyor is moving at a substantial speed. The ballast in the bottles renders the bottles stable and allows them to be advanced at a substantial speed without undue fallovers.

Figure 2:
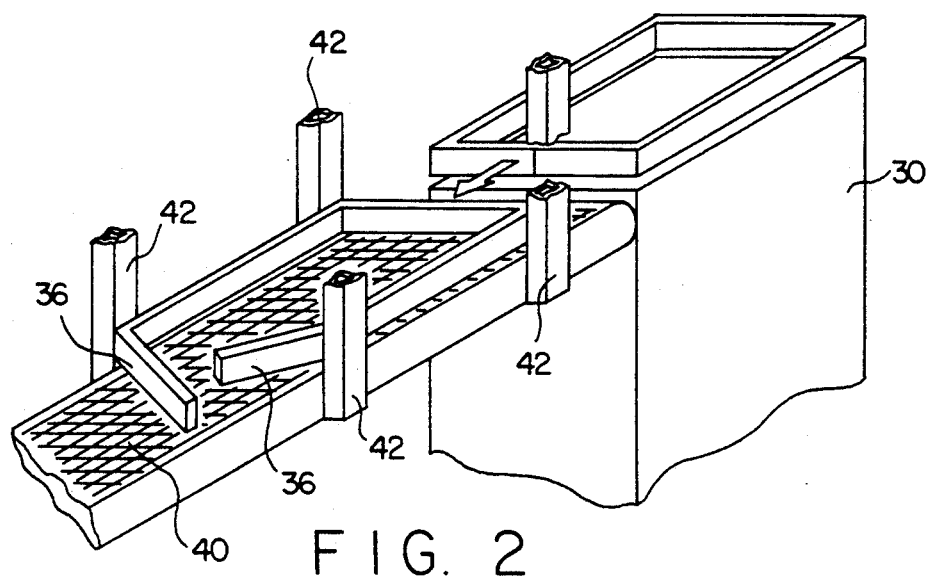
FIG. 2 is a perspective view from an opposite direction, with the depalletizer shown generally and the ballast reservoir broken away.

FIG. 2 illustrates an embodiment including one or more gates 36 for retaining the rank in position at the dispensing station. The gates 36 can by pivotable vertically or horizontally, for example being mounted on supports 42 for the ballast reservoir 44. An air cylinder (not shown) can advance and retract the gates for each ballast loading cycle.

Figure 3:
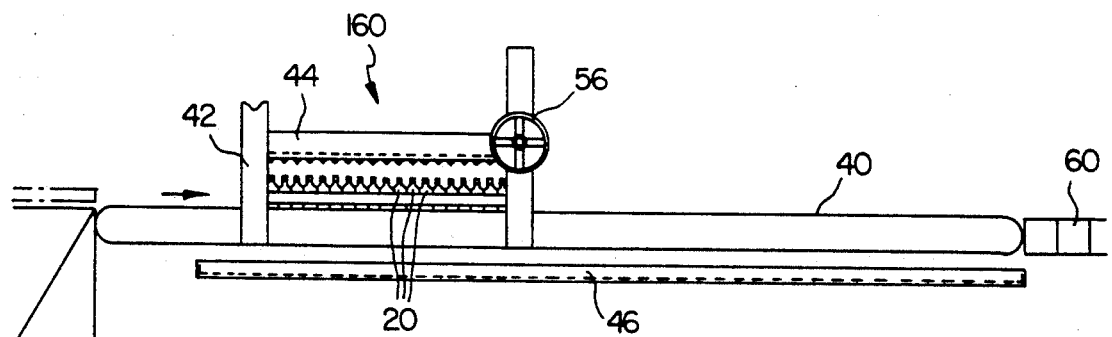
FIG. 3 is an elevation view thereof.

As shown in FIG. 3, the ballast reservoir 44 can be vertically adjustable, for example via handwheel 56. This enables the orifices in the reservoir to be placed immediately over the open tops of the bottles. The handwheel can drive a rack and pinion positioning mechanism or a winch for lifting and lowering the reservoir. Suitable locking means fix the reservoir at the desired position.

Conveyor 60 (see FIG. 1) advances the bottles, preferably in single file, to a rinsing apparatus 110. The incoming conveyor 40 can be positioned at the height of the highest rank of bottles in a pallet, and the conveyor path downstream along the bottle path can include a decrease in elevation via inclined conveyor section 70. This enables mounting of the rinsing apparatus and filler/capper at floor level. A suitable inclined conveyor is available under the tradename Lowerlator.

Figure 4:
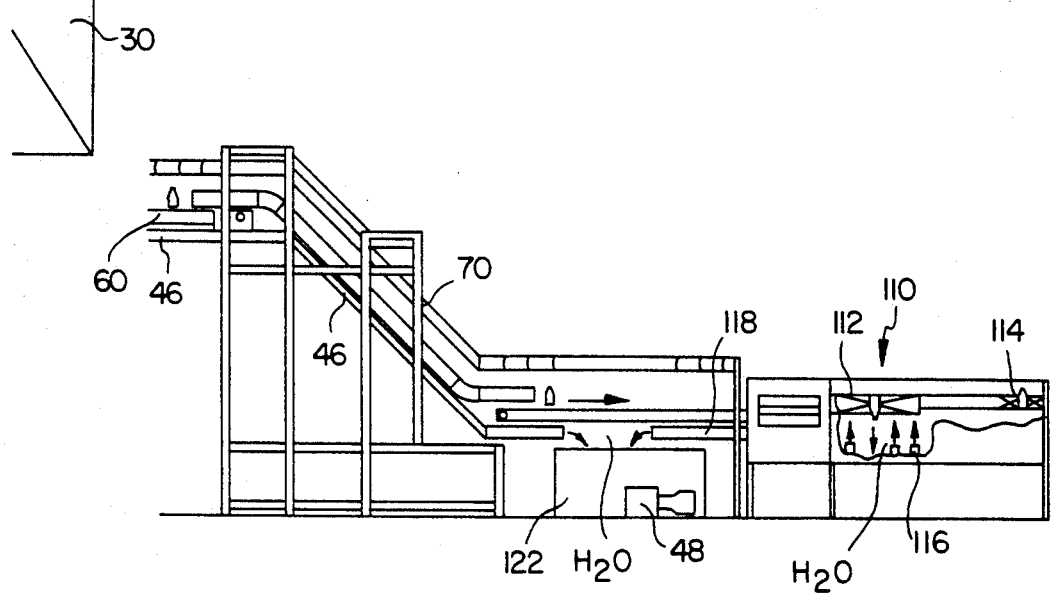
FIG. 4 is an elevation view of a further section in the handling process, leading to a container rinser.

The rinsing apparatus 110 as shown in FIG. 4 inverts the bottles initially, thereby unloading the ballast via gravity, sprays a rinse solution (preferably also clean water) into each bottle, and after a draining time replaces the bottle upright. During passage from the ballast loading apparatus 160 to the rinsing apparatus 110, the bottles are stable, and this is achieved without adding to the material or expense of the bottles. The ballast system has a minimal effect on the bottling process as a whole. Inasmuch as the bottles are to be rinsed in any case, the ballast does not require additional steps to remove or further clean the bottle, in addition to that already undertaken in the known rinser.

Overspray and drained rinse solution or ballast is preferably recovered. In the area of ballast loader 160 a catch basin 46 defining a wide channel under conveyor 40 receives overspray and the like from the ballast loader. The channel can extend continuously along the length of the inclined section 70 to the rinsing apparatus to catch ballast dripping from the outside of the bottles. Alternatively, the catch basin 46 can be connected by suitable conduits to the ballast storage reservoir 44 with a pump provided for moving the collected ballast fluid or material back to the ballast dispenser. In the embodiment shown in FIGS. 3 and 4, the catch basin 46 is arranged to drain into the same reservoir 122 used by the rinser 110. A pump 48 moves the ballast material back to the reservoir 44 and also provides pressurized water for rinser heads 116. Pump 48 or a valve along the path from pump 48 to the reservoir 44 can be operable under control of a level or pressure sensor at reservoir 44 (not shown), for maintaining a predetermined level or pressure of ballast fluid in the reservoir.

The rinser 110 also includes a catch basin 118 draining into a tank 122, collecting overspray and drainage, and recycling the solution. The preferred solution for both ballast and rinsing is clean water, and suitable filtering and/or water purification apparatus can be associated with the water handling systems for both ballast and rinsing such that the water remains clean for at least a number of ballast or rinsing cycles. Of course it is also possible to use fresh water for ballast and/or rinsing and simply to discard the water after use.

The rinser 110 receives bottles from the inclined conveyor section 70 and inverts the bottles via an inverting guideway 112 leading to a section of conveyor at which the bottles are moved while inverted. The rinse spray and drainage collection means are disposed at this section. A further inverting guideway 114 returns the bottles to the upright orientation for filling and capping at an apparatus (not shown) placed downstream of the rinser along the bottle path, in a conventional manner. Inverting guideways and filler/capper apparatus are known in the art per se. However, the operational speed of conveyors; rinsers and filler/capper apparatus has been limited as applied to lightweight containers due to problems with handling the containers in a manner that is not unduly subject to jamming.

The preferred containers (e.g., bottles) essentially comprise polyethylene terephthalate, which is lightweight and durable. Water ballast dispensed into the bottles in an amount sufficient to fill the bottles to 0.5 to 1.5 inches from the bottom is normally sufficient to enable substantially increased production speeds, approaching the speeds at which glass bottles can be handled. Accordingly, added ballast in an amount about 3 to 10% of a total volume of the containers is added at dispenser 160. Whereas empty plastic bottles can be handled on horizontal support conveyors at typical rates of 450 bottles per minute, bottles including water ballast can be handled at 1,000 to 1,600 bottles per minute without undue jamming. The preferred quantities of ballast in standard size beverage bottles, for example, is 1.5 ounce for a 16 or 20 ounce bottle, 2.0 ounces for a one liter bottle and 2.5 ounces for a two liter bottle. Comparable ballast quantities can be used in containers and bottles of other types, not limited to beverage containers but also for other consumer products and the like.

The ballast can be dispensed into the bottles according to a number of specific techniques and apparatus. Preferably the ballast is dispensed into a number of the bottles simultaneously, however it is also possible to dispense the ballast by sensing the position of individual bottles and operating a valve or the like to dispense the ballast into each bottle as it passes the valve. Another possibility is to operate the ballast dispenser continuously, dispensing spray generally and at a flow rate which is sufficient to accumulate the required amount of ballast in each bottle over to the time in which the bottles pass the continuously operating dispenser. In that case the ballast can be dispensed from one or more wide pattern spray heads directed downwardly over the path of the bottles along conveyor 40.

Figure 5:
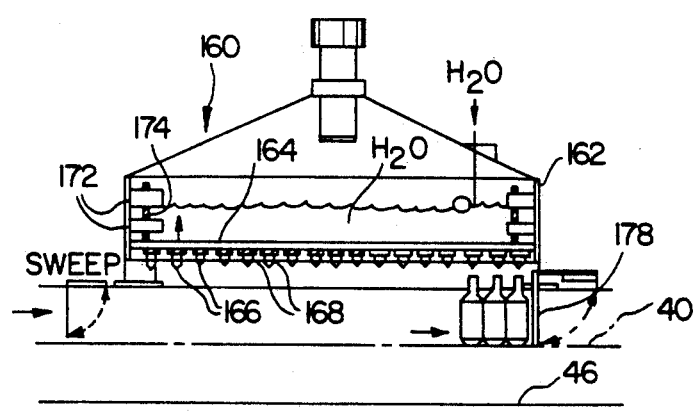
FIG. 5 is a section view showing a preferred ballast dispenser according to the invention.
Figure 6:
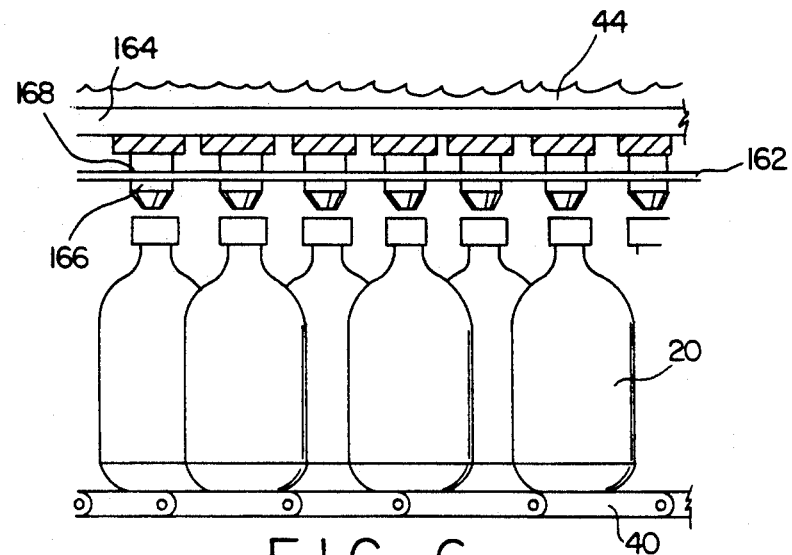
FIG. 6 is a partial elevation view of the ballast dispenser.
Figure 7:
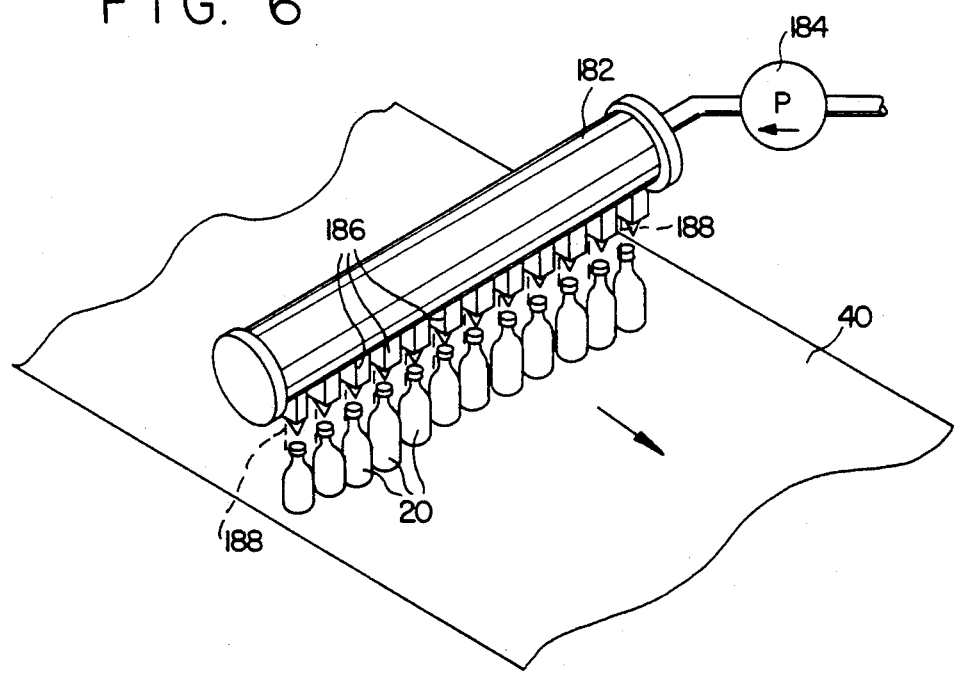
FIG. 7 is a perspective view of a ballast dispenser according to an alternative embodiment.

Preferably the ballast is dispensed into a group of the containers from a rank 26 from a pallet as shown in FIGS. 1, 3, 5 and 6, before forming the containers into a row. The dispenser can simultaneously load ballast in an X-Y array of the containers, for example an entire rank 26. Alternatively, the dispenser can simultaneously load a lateral line of the containers in a rank as shown in FIG. 7.

For dispensing ballast into a line or rank, a plurality of orifices in the lower wall of a reservoir or pressurized ballast storage vessel can be provided. Means can be provided for opening a plurality of valves as the bottles in a rank pass the valves. The bottles in the pallet are placed directly against one another and thus define a regular array. The depalletizer sweep places the bottles on the conveyor 40 in a predictable array, and the orifices or valves in the dispenser 160 are aligned to the array, as shown in FIGS. 5 and 6. Apart from the depalletizer a gate 36 can be placed at the end of the dispenser 160 along the path of conveyor 40 such that the bottles queue against the gate and assume a regular array, as shown in FIG. 2. This array can be a linear array (FIG. 7) or a matrix array (FIG. 1). The bottles can be stopped for ballast loading or allowed to advance continuously. For retaining alignment of the ballast orifices and moving bottles, an indexing or tracking drive (not shown) can be associated with the dispenser 160 such that the valves or orifices dispensing the ballast will track moving bottles on the conveyor 40, to direct the ballast into the open tops of the bottles for a sufficient time to load the bottles with the required amount of ballast.

According to a preferred embodiment of the dispenser as shown in FIGS. 5 and 6, valves in the required array are defined by a plurality of openings or valve seats 168 in the bottom wall of the reservoir. The openings or valve seats 168 are controllably plugged by valve bodies 166 attached to a common support 164. The common support is displaced upwardly to simultaneously open the valves by lifting all the valve bodies 166 relative to the seats 168 at one time. A cam drive, air cylinder, electromagnetic (solenoid) drive or the like (not shown) can lift the common support 164, which is preferably slidably disposed via guide shafts 174 on support blocks 172 fixed on the inner wall of the reservoir. It is also possible to arrange the valves in reverse order, i.e., with a plate (e.g., the bottom wall of the reservoir) defining a plurality of valve seats and a framework supporting the valve bodies for upward and downward displacement relative to the plate from outside the reservoir.

An alternative embodiment of the invention is shown in FIG. 4. According to this embodiment, the ballast dispenser includes a pressurized fluid supply rather than a gravity feed supply as in FIG. 3. A pump 184 can be provided to pressurize the supply vessel 182, which has an array of solenoid valves 186 directed toward the containers. The valves 186 can be operated simultaneously, for example when a row or other array of containers abuts a gate (not shown in FIG. 7) along the conveyor. Alternatively, as indicated by the dashed lines in FIG. 7, each valve can be operable individually. A control photoeye is directed downwardly to detect the passing edge of a bottle 20, whereupon the valve is opened for a predetermined time, for example a time determined as a function of conveyor speed or a preset time controlled by a one shot timer of the like.

In addition to the foregoing valved dispensers, it is also possible as noted above to direct a steady spray of ballast water on the area occupied by the bottles. In passing the area, each of the bottles accumulates a quantity of ballast water, which can be pumped in a circuit between a collection reservoir under the bottle zone to the spray heads over the bottles.

The invention as disclosed is an improved handling system for empty containers 20, the handling system having a conveyor 40 operable to support and transport the containers when rested thereon, and means 30 for delivering containers to the conveyor in an upright orientation. The ballast dispensing apparatus 160 is operable to dispense a quantity of ballast into containers 20 in the upright orientation, the ballast stabilizing the containers when transported on the conveyor 40. A container inverting apparatus 112, 114 is associated with a destination 110 of the conveyor, and is operable to invert the containers 20 for removing the ballast. The containers are preferably bottles, and the means for delivering the containers is a bottle depalletizer operable to remove a rank 26 of bottles from a pallet and to funnel the rank of bottles into a line. The ballast dispensing apparatus 160 can be disposed adjacent the depalletizer and operable to dispense ballast into a plurality of the bottles prior to being funneled into the line. The container inverting apparatus is associated with a container rinser 110 operable to invert the containers and to rinse the containers via a rinse fluid directed upwardly into the inverted containers. The handling system can be a bottling system and further comprises a filling station.

In a preferred embodiment the ballast dispensing apparatus 160 includes a fluid supply 160, 182 with at least one valve 166, 168, 186 directed toward the containers 20 and means 164, 188 for opening the valve when a container is in position to receive the ballast. A plurality of valves 166, 168, 186 can be operable simultaneously to dispense the ballast into a plurality of containers at once. For this purpose, the fluid supply can include a reservoir 162 disposed over the containers and the valves are defined by a plurality of openings 168 in a reservoir wall controllably plugged by valve bodies 166 attached to a common support 164. Means 176, 174, 172 for displacing the common support simultaneously open the valves.

The invention having been disclosed, variations will now occur to persons skilled in the art and aware of this disclosure. The foregoing disclosure of preferred embodiments is not meant to be limiting, and reference should be made to the appended claims rather than the foregoing specification to assess the scope of the invention in which exclusive rights are claimed.

I claim:

1. A method for handling lightweight open containers, the containers defining an internal volume and having a center of gravity when empty, the method comprising the steps of:
    arranging the containers in an upright orientation;
    dispensing a limited quantity of ballast into the containers, the quantity being substantially less than the internal volume, whereby the containers and the ballast therein have a center of gravity substantially lower than the center of gravity of the containers when empty;
    moving the containers along a conveyor, the ballast tending to prevent the containers from falling over while being moved along the conveyor.

2. The method according to claim 1, further comprising inverting the containers to remove the ballast.

3. The method according to claim 2, wherein the containers are plastic bottles, said conveyor moving the containers to a rinsing apparatus, the containers being inverted at the rinsing apparatus.

4. The method according to claim 3, wherein the containers essentially comprise polyethylene terephthalate and the ballast is water, the ballast being dispensed into the containers in an amount of about 3 to 10% of a total volume of the containers.

5. The method according to claim 1, comprising arranging the containers in an array in said upright orientation and dispensing the ballast into the containers substantially simultaneously for each of the containers in the array.

6. The method according to claim 5, comprising providing a group of the containers from a rank in a pallet of containers, dispensing said ballast into the containers and forming the group of containers into a row.

7. The method according to claim 5, wherein the array is an X-Y array of the containers.

8. The method according to claim 5, wherein the array is a line of the containers.

9. The method according to claim 5, wherein the ballast is water dispensed from a reservoir by opening a plurality of valves.

10. The method according to claim 9, wherein the valves are defined by a plurality of openings in a reservoir wall controllably plugged by valve bodies attached to a common support, and wherein said dispensing includes displacing the common support to simultaneously open the valves.

11. A method for handling lightweight open containers, comprising the steps of:
    arranging the containers in an upright orientation, the containers being lightweight plastic;
    dispensing a quantity of ballast into the containers the ballast being a liquid and being dispensed into the containers in an amount of about 3 to 10% of a total volume of the containers;
    moving the containers along a conveyor, the ballast tending to keep the containers stable on the conveyor.

12. The method according to claim 11, further comprising inverting the containers to remove the ballast.

13. The method according to claim 12, wherein the containers are plastic bottles, said conveyor moving the containers to a rinsing apparatus, the containers being inverted at the rinsing apparatus.

14. The method according to claim 11, wherein the containers essentially comprise polyethylene terephthalate and the ballast is water.

15. The method according to claim 11, comprising arranging the containers in an array in said upright orientation and dispensing the ballast into the containers substantially simultaneously for each of the containers in the array.

16. The method according to claim 11, comprising providing a group of the containers from a rank in a pallet of containers, dispensing said ballast into the containers and forming the group of containers into a row.

17. The method according to claim 15, wherein the array is an X-Y array of the containers.

18. The method according to claim 15, wherein the array is a line of the containers.

19. The method according to claim 15, wherein the ballast is water disposed from a reservoir by opening a plurality of valves.

20. The method according to claim 19, wherein the valves are defined by a plurality of openings in a reservoir wall controllably plugged by valve bodies attached to a common support, and wherein said dispensing includes displacing the common support to simultaneously open the valves.

* * * * *